UNITED STATES PATENT OFFICE.

EDWIN D. CHAPLIN, OF BOSTON, MASSACHUSETTS, ASSIGNOR, BY MESNE ASSIGNMENTS, TO CRYSTAL SWEET COMPANY, OF BOSTON, MASSACHUSETTS, A CORPORATION OF MASSACHUSETTS.

SWEETENED FOOD COMPOUND AND METHOD OF PREPARING SAME.

No. 851,221.  Specification of Letters Patent.  Patented April 23, 1907.

Application filed June 28, 1905. Serial No. 267,342.

*To all whom it may concern:*

Be it known that I, EDWIN D. CHAPLIN, a citizen of the United States, residing at Boston, county of Suffolk, and State of Massachusetts, have invented an Improvement in Sweetened Food Compounds and Methods of Preparing the Same, of which the following description is a specification.

My invention relates to sweetened food compounds and methods of producing the same, being more particularly concerned with the mixture of a highly concentrated sweetening ingredient with a body material, the latter having either relatively low sweetening capacity or none at all, with a view to the production of a resultant harmless ingredient which may be practically used in substitution for sugar or other sweetening substances in the non-adulterant sweetening of such food products and the like as may be adapted therefor.

My invention will be best understood by reference to the following description of one specific embodiment thereof and of the preferred mode of preparing and compounding the same, these being submitted wholly for illustrative purposes, while its scope will be more particularly pointed out in the appended claims.

The concentrated sweetening ingredient which I prefer to employ on account of its availability, its intense sweetness and its harmless nature as a food product, is benzoic sulphonic imide, although it is to be understood that my invention, while admirably carried out by the use of this substance, may be carried out in any desired manner within the scope of the invention. This substance, which is commonly known as saccharin, or sometimes as garantose, is crystalline in its structure and has a sweetening effect which is approximately six hundred times greater than that of ordinary sugar. In its concentrated and unadulterated form this substance is so sweet as to paralyze the sensation of taste, but when suitably diluted or adulterated it may be used as a food product in substitution for sugar. In fact its effect upon the system in cases of diabetes is harmless as contrasted with that of sugar, which, as is well known, must be eaten of sparingly by those suffering from that trouble.

In carrying out my invention the intensely sweet ingredient, such as saccharin, is uniformly intermingled with or applied to the body material, which latter may be of any suitable character according to the use to which the resultant compound is to be applied. In its use as a sweetening ingredient for pastry or other cooking purposes the body material may be a sweetening ingredient of lesser sweetening effect than the intensely sweet ingredient, such for example, as sugar itself in its ordinary form.

It has heretofore been attempted to utilize saccharin for sweetening purposes in cookery, by using it with glucose, the glucose being used to give body and a relatively small proportion of saccharin being used to intensify the sweetness. The results, however, have been unsatisfactory, chiefly on account of the difficulty of obtaining a uniform diffusion of the intensely sweet ingredient throughout the body of the mixture to which it is applied.

If sugar were used as the body material and its sweetness intensified by the simple mixture therewith of saccharin, it would be found difficult or impossible to produce a resultant mixture which would have throughout its bulk the same proportions of sugar and saccharin. Both sugar and saccharin form crystals of different specific gravity and properties. Even if it were possible to give a uniform mechanical mixture to the two ingredients, there would be no way of preserving the uniformity, for the two materials tend to separate more or less and a measured quantity taken from one part of the mixed bulk would be likely to have quite different sweetening effects from an equal measured portion taken from another part of the mixed bulk.

In following out my invention I intermingle the two substances in the desired proportions and combine with the body material and the intensely sweet ingredient, some carrying or diffusing means which acts to preserve the uniform and desired mixture and maintain the even diffusion thereof throughout the mixed bulk. The particular means for effecting this result may of course be varied according to the character of the ingredients and the purpose to which the sweetened product is to be applied, but by way of illustration where a sugar substitute for baking purposes is desired, I make use of an adhesive carrier intimately mixed with the intensely sweet ingredient and applied as a coating to the individual sugar particles. Such a carrier for this purpose should of course be non-injurious to the health, should have no offensive taste and should not alter or spoil with lapse of time. Various materials may be used for this purpose and my invention is not limited to any particular substance in this respect, but I preferably employ some fatty solid, such for example as lard, butter or cottolene, which possesses the above characteristics and, when intimately mingled with the intensely sweet saccharin, makes an adhering paste which can be readily applied as a coating to the sugar. To illustrate, I have found that an effective sugar substitute for baking purposes is prepared by taking saccharin in the proportion of one-sixth of a pound to twenty-five pounds of granulated cane sugar. The saccharin is placed together with a fatty solid, for example, three quarters of a pound of cottolene, in a suitable receptacle provided with mixing and beating means where it can be readily mixed into the form of a creamy paste, throughout which the saccharin is uniformly diffused. This resultant paste consisting of a fatty solid uniformly impregnated with saccharin is then, together with the sugar, placed in a second receptacle provided with stirring or churning vanes and the two ingredients are there kept agitated until the sugar particles, which tend quickly to take up the paste, have become well and uniformly coated with the fatty adhesive carrier. The resultant substance resembles sugar, except the crystals are rendered softer by reason of their fatty coating; but the sweetness of the compound is five times greater than that of the corresponding bulk of sugar. The sweetening properties of such a mixture are not only uniform throughout the bulk thereof but the uniformity is permanent, and no matter how much handling the material undergoes, the sweetening effect of any measured quantity will remain always the same, and is the same as the sweetening effect of any other equal measured quantity.

While the method described provides a uniform, intensely sweet coating for comminuted material, such as granulated sugar, substances other than comminuted or granular may be profitably impregnated with a sweetened carrying substance, such as the cottolene carrier described. For example, when glucose is used in the manufacture of candy, the paste or cream prepared, as described, from the cottolene and saccharin, if beaten up with the glucose forms a resultant product which lacks much of the gumminess and adhesiveness of the original glucose and as a consequence the saccharin may not only be uniformly diffused throughout the body of the glucose, but the latter is easier to work and handle.

The application of the saccharin to the sugar by means of a fatty carrier has the further advantage of rendering the sugar more pliable and more easily rubbed into butter in preparation for cookery, for each individual particle thereof is already itself coated with the cottolene which gives the sugar the softness and flakiness of snow. For this reason as well as other advantages here suggested, when intensifying the sweetness of sugar by my invention I prefer to use some such fatty substance as lard, butter, olive oil or cottolene in applying the intensely sweet ingredients to the sugar particles, but obviously, under some conditions, other substances, such as oils, paraffine, gummy substances, gelatine and others might be employed in substitution thereof without departing from the spirit of my invention.

The pliability and softness which is given to the sugar by the mere addition of a viscous adhesive substance, such as cottolene, is a material advantage of itself since it produces a product better adapted to the purposes of cookery.

While I have described with particularity one form of my invention and one particular mode of preparing the same, it is to be understood that the invention may be carried out in any desired manner within the spirit and scope thereof, but that extensive modifications may be made in the described form herein without departing from the spirit thereof.

Claim.

1. A sweetening compound comprising sugar, the particles of which are coated with an adhesive carrier of a substance other than that to be coated and impregnated with a sweetening ingredient of relatively great sweetening capacity.

2. A sweetening compound comprising sugar, the particles of which are coated with a fatty carrier impregnated with a sweetening ingredinet of relatively great sweetening capacity.

3. A food product comprising a comminuted body material, the individual particles of which are coated with a mixture of saccharin and a permanent carrier of a substance differing from that to be coated.

4. A sweetening compound comprising a body of comminuted sugar, the individual particles of which are coated with a mixture of saccharin and a permanent carrier of a substance differing from that to be coated.

5. A sweetening compound comprising a body or bulk of comminuted sugar, with the particles of which there is individually associated uniformly throughout the sugar bulk saccharin and a permanent carrier of a substance differing from that to which it is applied, providing thereby a uniform and certain distribution of the saccharin throughout the sugar body.

6. A sweetening compound comprising a body of comminuted sugar, with the individual particles of which is associated a permanent carrier of a substance differing from that to which it is applied and saccharin, said carrying substance being uniformly distributed to the sugar particles throughout the bulk thereof to increase uniformly the sweetening properties thereof, while leaving the individual particles of sweetened sugar substantially free from adherence to each other.

7. The method of preparing a sweetened compound which consists in mixing saccharin with a permanent carrier of a substance differing from that to which it is to be applied and thereafter mixing the resultant compound with sugar and causing the same to adhere to the individual sugar particles.

8. The method of preparing a sweetened food which consists in uniformly and mechanically mixing saccharin and a permanent carrier of a substance differing from that to which it is to be applied with comminuted sugar.

9. A sweetening compound comprising sugar, the particles of which are coated with an adhesive carrier of a substance other than that to be coated and impregnated with saccharin.

10. A sweetening compound comprising sugar the particles of which are coated with a fatty carrier impregnated with saccharin.

In testimony whereof, I have signed my name to this specification, in the presence of two subscribing witnesses.

EDWIN D. CHAPLIN.

Witnesses:
   Geo. H. Emery,
   Thomas B. Booth.